(12) United States Patent
Kanetake et al.

(10) Patent No.: US 12,038,240 B2
(45) Date of Patent: Jul. 16, 2024

(54) REFRIGERANT PIPE, HEAT EXCHANGER, AND METHOD FOR PRODUCING REFRIGERANT PIPE

(71) Applicant: DAIKIN INDUSTRIES, LTD., Osaka (JP)

(72) Inventors: Mirei Kanetake, Osaka (JP); Yuuji Tanaka, Osaka (JP); Kunihiro Okada, Osaka (JP); Hideo Ohya, Osaka (JP); Hideo Katayama, Osaka (JP); Keisuke Imazu, Osaka (JP); Shouhei Araki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 18 days.

(21) Appl. No.: 17/043,413

(22) PCT Filed: Mar. 28, 2019

(86) PCT No.: PCT/JP2019/013811
§ 371 (c)(1),
(2) Date: Sep. 29, 2020

(87) PCT Pub. No.: WO2019/189668
PCT Pub. Date: Oct. 3, 2019

(65) Prior Publication Data
US 2021/0018282 A1    Jan. 21, 2021

(30) Foreign Application Priority Data

Mar. 30, 2018  (JP) .................................. 2018-067325

(51) Int. Cl.
*F28F 19/00* (2006.01)
*C09D 5/08* (2006.01)
(Continued)

(52) U.S. Cl.
CPC .............. *F28F 19/02* (2013.01); *C09D 5/086* (2013.01); *F28F 1/12* (2013.01); *F28F 21/084* (2013.01)

(58) Field of Classification Search
CPC . F28F 19/02; F28F 1/12; F28F 21/084; C09D 5/086
See application file for complete search history.

(56) References Cited

U.S. PATENT DOCUMENTS 4,737,299 A * 4/1988 Grasshoff ............ C10M 113/08
508/158
2010/0294166 A1   11/2010 Arafat
(Continued)

FOREIGN PATENT DOCUMENTS

CN        103361648 A    10/2013
JP         53-28544 A     3/1978
(Continued)

OTHER PUBLICATIONS

Extended European Search Report for European Application No. 19774901.3, dated Apr. 23, 2021.

*Primary Examiner* — Tho V Duong
(74) *Attorney, Agent, or Firm* — Birch, Stewart, Kolasch & Birch, LLP

(57) ABSTRACT

A copper-containing refrigerant pipe having an anticorrosive film, a heat exchanger, and a method for producing the refrigerant pipe are disclosed. The refrigerant pipe includes a pipe body including copper or a copper alloy and an anticorrosive film formed on the outer surface of the pipe body. The anticorrosive film is obtained by applying a
(Continued)

coating agent to the outer surface of the pipe body. The coating agent contains one or more anticorrosive agents selected from the group consisting of (A) an organic sulfonate compound, (B) a polyhydric alcohol-organic acid ester compound, and (C) an aliphatic amine compound having 8 to 24 carbon atoms. When the coating agent includes an anticorrosive agent of (C) the aliphatic amine compound having 8 to 24 carbon atoms, (C) the aliphatic amine compound having 8 to 24 carbon atoms is included in an amount of 2.0 wt % or more and 10.0 wt % or less in the coating agent.

5 Claims, 5 Drawing Sheets

(51) Int. Cl.
*F28F 1/12* (2006.01)
*F28F 19/02* (2006.01)
*F28F 21/08* (2006.01)

(56) References Cited

U.S. PATENT DOCUMENTS

| | | |
|---|---|---|
| 2013/0330564 A1 | 12/2013 | Straetmans et al. |
| 2015/0247061 A1 | 9/2015 | Craun et al. |
| 2016/0075886 A1 | 3/2016 | Knell et al. |
| 2017/0283731 A1 | 10/2017 | Gao et al. |
| 2018/0209707 A1 | 7/2018 | Aoki et al. |

FOREIGN PATENT DOCUMENTS

| | | |
|---|---|---|
| JP | 4-314896 A | 11/1992 |
| JP | 6-10185 A | 1/1994 |
| JP | 8-500135 A | 1/1996 |
| JP | 2007-297481 A | 11/2007 |
| JP | 2007-302791 A | 11/2007 |
| JP | 2008-93713 A | 4/2008 |
| JP | 2011-99152 A | 5/2011 |
| JP | 2014-514446 A | 6/2014 |
| JP | 2016-216811 A | 12/2016 |
| JP | 6041014 B1 | 12/2016 |
| WO | WO 94/03564 A1 | 2/1994 |
| WO | WO 2015/003088 A1 | 1/2015 |

* cited by examiner

REFRIGERANT PIPE, HEAT EXCHANGER, AND METHOD FOR PRODUCING REFRIGERANT PIPE

TECHNICAL FIELD

The present disclosure relates to a refrigerant pipe, a heat exchanger, and a method for producing a refrigerant pipe.

BACKGROUND ART

Conventionally, copper, to suppress its corrosion, has sometimes been used with its surface been coated with an anticorrosive agent.

Here, a copper pipe used in a refrigeration apparatus may corrode to have a hole through which refrigerant flowing inside the tube leaks out.

To overcome this, for example, PTL 1 (Japanese Patent No. 6041014) has proposed that an anticorrosive film is formed on the outer surface of a copper-containing refrigerant pipe by applying a coating agent including a specific benzotriazole compound and a metalworking fluid to thereby suppress corrosion of the refrigerant pipe.

SUMMARY OF INVENTION

Technical Problem

Although it has been proposed that an anticorrosive film is formed on the outer surface to suppress corrosion as in the refrigerant pipe disclosed in PTL 1, no studies have hitherto been made on materials that are capable of suppressing corrosion of pipes including copper and that are other than the benzotriazole compound disclosed in PTL 1.

The present disclosure has been made in view of the above point, and an object thereof is to provide a copper-containing refrigerant pipe whose corrosion can be suppressed, a heat exchanger, and a method for producing a refrigerant pipe.

Solution to Problem

A refrigerant pipe according to a first aspect includes a pipe body including copper or a copper alloy and an anticorrosive film formed on the outer surface of the pipe body. The anticorrosive film includes one or more anticorrosive agents selected from the group consisting of (A) an organic sulfonate compound, (B) a polyhydric alcohol-organic acid ester compound, and (C) an aliphatic amine compound having 8 to 24 carbon atoms. When the anticorrosive film includes an anticorrosive agent of (C) the aliphatic amine compound having 8 to 24 carbon atoms, the anticorrosive film includes (C) the aliphatic amine compound having 8 to 24 carbon atoms in an amount of 1.5 μg or more and 200.0 μg or less per square centimeter.

In this refrigerant pipe, corrosion can be suppressed.

A refrigerant pipe according to a second aspect is the refrigerant pipe according to the first aspect, wherein the anticorrosive film includes at least one of (A) the organic sulfonate compound in an amount of 0.1 μg or more and 200.0 μg or less per square centimeter, (B) the polyhydric alcohol-organic acid ester compound in an amount of 0.1 μg or more and 200.0 μg or less per square centimeter (excluding cases where the aliphatic amine compound having 8 to 24 carbon atoms is included in an amount equal to or larger than the amount of (B) the polyhydric alcohol-organic acid ester compound), and (C) the aliphatic amine compound having 8 to 24 carbon atoms in an amount of 1.5 μg or more and 200.0 μg or less per square centimeter (excluding cases where the polyhydric alcohol-organic acid ester compound is included in an amount equal to or larger than the amount of (C) the aliphatic amine compound having 8 to 24 carbon atoms).

In this refrigerant pipe, acidic corrosion can be suppressed.

A refrigerant pipe according to a third aspect is the refrigerant pipe according to the first aspect, wherein the anticorrosive film includes (B) the polyhydric alcohol-organic acid ester compound in an amount of 0.1 μg or more and 200.0 μg or less per square centimeter (excluding cases where the aliphatic amine compound having 8 to 24 carbon atoms is included in an amount equal to or larger than the amount of (B) the polyhydric alcohol-organic acid ester compound), or (C) the aliphatic amine compound having 8 to 24 carbon atoms in an amount of 1.5 μg or more and 200.0 μg or less per square centimeter (excluding cases where the polyhydric alcohol-organic acid ester compound is included in an amount equal to or larger than the amount of (C) the aliphatic amine compound having 8 to 24 carbon atoms). The anticorrosive film further includes (D) a succinic anhydride derivative represented by formula (I) below.

In this refrigerant pipe, acidic corrosion can be suppressed.

(I)

[In the above formula (I), R represents a linear or branched aliphatic hydrocarbon group having 8 to 24 carbon atoms.]

A refrigerant pipe according to a fourth aspect includes a pipe body including copper or a copper alloy and an anticorrosive film formed on the outer surface of the pipe body. The anticorrosive film is obtained by applying a coating agent to the outer surface of the pipe body, the coating agent containing one or more anticorrosive agents selected from the group consisting of (A) an organic sulfonate compound, (B) a polyhydric alcohol-organic acid ester compound, and (C) an aliphatic amine compound having 8 to 24 carbon atoms. When the coating agent includes an anticorrosive agent of (C) the aliphatic amine compound having 8 to 24 carbon atoms, (C) the aliphatic amine compound having 8 to 24 carbon atoms is included in an amount of 1.5 wt % or more and 10.0 wt % or less in the coating agent.

In this refrigerant pipe, corrosion can be suppressed.

A refrigerant pipe according to a fifth aspect is the refrigerant pipe according to the fourth aspect, wherein the coating agent includes at least one of (A) the organic sulfonate compound in an amount of 0.1 wt % or more and 8.0 wt % or less, (B) the polyhydric alcohol-organic acid ester compound in an amount of 0.1 wt % or more and 10.0 wt % or less (excluding cases where the aliphatic amine compound having 8 to 24 carbon atoms is included in an amount equal to or larger than the amount of (B) the polyhydric alcohol-organic acid ester compound), and (C) the aliphatic amine compound having 8 to 24 carbon atoms in an amount of 1.5 wt % or more and 10.0 wt % or less (excluding cases where the polyhydric alcohol-organic acid ester compound is included in an amount equal to or larger than the amount of (C) the aliphatic amine compound having 8 to 24 carbon atoms).

In this refrigerant pipe, acidic corrosion can be suppressed.

A refrigerant pipe according to a sixth aspect is the refrigerant pipe according to the fourth or fifth aspect, wherein the anticorrosive film is obtained by drying the applied coating agent under conditions where the coating agent has a surface temperature of 60° C. or higher and 200° C. or lower.

In this refrigerant pipe, the fixability of the anticorrosive film to the pipe body can be increased.

A refrigerant pipe according to a seventh aspect is the refrigerant pipe according to any one of the fourth to sixth aspects, wherein the coating agent includes a volatile metalworking fluid.

In this refrigerant pipe, since the coating agent includes a volatile metalworking fluid, the uniformity of a coating film is more readily increased than when the anticorrosive agent alone is applied.

A refrigerant pipe according to an eighth aspect is the refrigerant pipe according to any one of the fourth to seventh aspects, wherein the coating agent includes (B) the polyhydric alcohol-organic acid ester compound in an amount of 0.1 wt % or more and 10.0 wt % or less (excluding cases where the aliphatic amine compound having 8 to 24 carbon atoms is included in an amount equal to or larger than the amount of (B) the polyhydric alcohol-organic acid ester compound), or (C) the aliphatic amine compound having 8 to 24 carbon atoms in an amount of 1.5 wt % or more and 10.0 wt % or less (excluding cases where the polyhydric alcohol-organic acid ester compound is included in an amount equal to or larger than the amount of (C) the aliphatic amine compound having 8 to 24 carbon atoms). The coating agent further includes (D) a succinic anhydride derivative represented by formula (I) below.

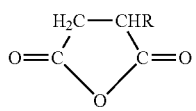

(I)

[In the above formula (I), R represents a linear or branched aliphatic hydrocarbon group having 8 to 24 carbon atoms.]

In this refrigerant pipe, acidic corrosion can be suppressed.

A refrigerant pipe according to a ninth aspect is the refrigerant pipe according to any one of the first to eighth aspects, wherein (B) the polyhydric alcohol-organic acid ester compound is a glycerol fatty acid ester represented by formula (II) below.

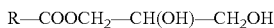

R—COOCH$_2$—CH(OH)—CH$_2$OH    Formula (II)

[In the above formula (II), R represents a linear or branched aliphatic hydrocarbon group having 11 to 29 carbon atoms.]

In this refrigerant pipe, acidic corrosion can be sufficiently suppressed.

A refrigerant pipe according to a tenth aspect is the refrigerant pipe according to the ninth aspect, wherein the glycerol fatty acid ester is monoglyceryl oleate.

In this refrigerant pipe, acidic corrosion can be more sufficiently suppressed.

A refrigerant pipe according to an eleventh aspect is the refrigerant pipe according to any one of the first to tenth aspects, wherein (C) the aliphatic amine compound having 8 to 24 carbon atoms is oleylamine.

In this refrigerant pipe, acidic corrosion can be sufficiently suppressed.

A refrigerant pipe according to a twelfth aspect is the refrigerant pipe according to any one of the first to eleventh aspects, wherein the anticorrosive agent includes (A) the organic sulfonate compound. (A) The organic sulfonate compound is a synthesized sulfonate compound represented by formula (III) below and/or a synthesized sulfonate compound represented by formula (IV) below.

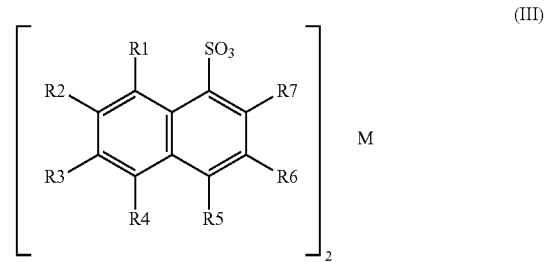

(III)

[In the above formula (III), R1 to R7 each independently represent hydrogen or an aliphatic hydrocarbon group having 4 to 12 carbon atoms (excluding the case where R1 to R7 are all hydrogen), and M represents Ca or Zn.]

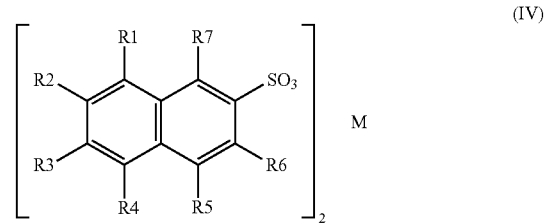

(IV)

[In the above formula (IV), R1 to R7 each independently represent hydrogen or an aliphatic hydrocarbon group having 4 to 12 carbon atoms (excluding the case where R1 to R7 are all hydrogen), and M represents Ca or Zn.]

In this refrigerant pipe, acidic corrosion can be sufficiently suppressed.

A refrigerant pipe according to a thirteenth aspect is the refrigerant pipe according to the twelfth aspect, wherein (A) the organic sulfonate compound is calcium dinonylnaphthalene sulfonate.

In this refrigerant pipe, acidic corrosion can be more sufficiently suppressed.

A heat exchanger according to a fourteenth aspect includes a heat transfer tube that is the refrigerant pipe according to any one of the first to thirteenth aspects, and a heat transfer fin fixed to the heat transfer tube.

In this heat exchanger, corrosion of the heat transfer tube is suppressed, and thus when the heat exchanger is used as a part of a refrigerant circuit of a refrigeration apparatus, leakage of refrigerant from the heat exchanger where a relatively large amount of refrigerant is likely to gather can be suppressed.

A heat exchanger according to a fifteenth aspect is the heat exchanger according to the fourteenth aspect, wherein the heat transfer fin is formed of aluminum or an aluminum alloy. The anticorrosive agent is not present on the outer surface of the heat transfer fin.

In this heat exchanger, the water-repellency of the outer surface of the heat transfer fin is low, whereby scattering of dew condensation water from the surface of the heat transfer fin can be suppressed.

A method for producing a refrigerant pipe according to a sixteenth aspect includes a step of providing a pipe body including copper or a copper alloy, and a step of forming an anticorrosive film by applying a coating agent to the outer surface of the pipe body, the coating agent containing one or more anticorrosive agents selected from the group consisting of (A) an organic sulfonate compound, (B) a polyhydric alcohol-organic acid ester compound, and (C) an aliphatic amine compound having 8 to 24 carbon atoms. When the coating agent includes an anticorrosive agent of (C) the aliphatic amine compound having 8 to 24 carbon atoms, (C) the aliphatic amine compound having 8 to 24 carbon atoms is included in an amount of 1.5 wt % or more and 10.0 wt % or less in the coating agent.

This method for producing a refrigerant pipe provides a refrigerant pipe whose corrosion can be suppressed.

A method for producing a refrigerant pipe according to a seventeenth aspect is the method for producing a refrigerant pipe according to the sixteenth aspect, wherein the coating agent includes at least one of (A) the organic sulfonate compound in an amount of 0.1 wt % or more and 8.0 wt % or less, (B) the polyhydric alcohol-organic acid ester compound in an amount of 0.1 wt % or more and 10.0 wt % or less (excluding cases where the aliphatic amine compound having 8 to 24 carbon atoms is included in an amount equal to or larger than the amount of (B) the polyhydric alcohol-organic acid ester compound), and (C) the aliphatic amine compound having 8 to 24 carbon atoms in an amount of 1.5 wt % or more and 10.0 wt % or less (excluding cases where the polyhydric alcohol-organic acid ester compound is included in an amount equal to or larger than the amount of (C) the aliphatic amine compound having 8 to 24 carbon atoms).

This method for producing a refrigerant pipe provides a refrigerant pipe whose acidic corrosion can be suppressed.

A method for producing a refrigerant pipe according to an eighteenth aspect is the method for producing a refrigerant pipe according to the sixteenth or seventeenth aspect, wherein the coating agent includes (B) the polyhydric alcohol-organic acid ester compound in an amount of 0.1 wt % or more and 10.0 wt % or less (excluding cases where the aliphatic amine compound having 8 to 24 carbon atoms is included in an amount equal to or larger than the amount of (B) the polyhydric alcohol-organic acid ester compound), or (C) the aliphatic amine compound having 8 to 24 carbon atoms in an amount of 1.5 wt % or more and 10.0 wt % or less (excluding cases where the polyhydric alcohol-organic acid ester compound is included in an amount equal to or larger than the amount of (C) the aliphatic amine compound having 8 to 24 carbon atoms). The coating agent further includes (D) a succinic anhydride derivative represented by formula (I) below.

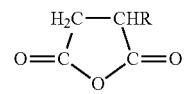

[In the above formula (I), R represents a linear or branched aliphatic hydrocarbon group having 8 to 24 carbon atoms.]

This method for producing a refrigerant pipe provides a refrigerant pipe whose acidic corrosion can be suppressed.

A method for producing a refrigerant pipe according to a nineteenth aspect is the method for producing a refrigerant pipe according to any one of the sixteenth to eighteenth aspects, wherein (B) the polyhydric alcohol-organic acid ester compound is a glycerol fatty acid ester represented by formula (II) below.

$$R\text{—}COOCH_2\text{—}CH(OH)\text{—}CH_2OH \qquad \text{Formula (II)}$$

[In the above formula (II), R represents a linear or branched aliphatic hydrocarbon group having 11 to 29 carbon atoms.]

This method for producing a refrigerant pipe provides a refrigerant pipe whose acidic corrosion can be sufficiently suppressed.

A method for producing a refrigerant pipe according to a twentieth aspect is the method for producing a refrigerant pipe according to the nineteenth aspect, wherein the glycerol fatty acid ester is monoglyceryl oleate.

This method for producing a refrigerant pipe provides a refrigerant pipe whose acidic corrosion can be more sufficiently suppressed.

A method for producing a refrigerant pipe according to a twenty-first aspect is the method for producing a refrigerant pipe according to any one of the sixteenth to twentieth aspects, wherein (C) the aliphatic amine compound having 8 to 24 carbon atoms is oleylamine.

This method for producing a refrigerant pipe provides a refrigerant pipe whose acidic corrosion can be sufficiently suppressed.

A method for producing a refrigerant pipe according to a twenty-second aspect is the method for producing a refrigerant pipe according to any one of the sixteenth to twenty-first aspects, wherein the anticorrosive agent includes (A) the organic sulfonate compound. (A) The organic sulfonate compound is a synthesized sulfonate compound represented by formula (III) below and/or a synthesized sulfonate compound represented by formula (IV) below.

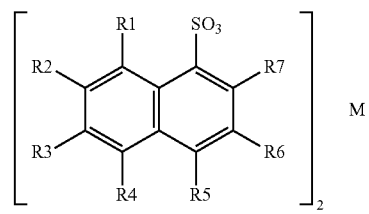

[In the above formula (III), R1 to R7 each independently represent hydrogen or an aliphatic hydrocarbon group having 4 to 12 carbon atoms (excluding the case where R1 to R7 are all hydrogen), and M represents Ca or Zn.]

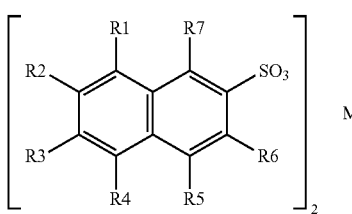

(IV)

[In the above formula (IV), R1 to R7 each independently represent hydrogen or an aliphatic hydrocarbon group having 4 to 12 carbon atoms (excluding the case where R1 to R7 are all hydrogen), and M represents Ca or Zn.]

This method for producing a refrigerant pipe provides a refrigerant pipe whose acidic corrosion can be sufficiently suppressed.

A method for producing a refrigerant pipe according to a twenty-third aspect is the method for producing a refrigerant pipe according to the twenty-second aspect, wherein (A) the organic sulfonate compound is calcium dinonylnaphthalene sulfonate.

This method for producing a refrigerant pipe provides a refrigerant pipe whose acidic corrosion can be more sufficiently suppressed.

A method for producing a refrigerant pipe according to a twenty-fourth aspect is the method for producing a refrigerant pipe according to any one of the sixteenth to twenty-third aspects, wherein the anticorrosive film is formed by drying the applied coating agent under conditions where the coating agent has a surface temperature of 60° C. or higher and 200° C. or lower.

In this method for producing a refrigerant pipe, the anticorrosive film is readily fixed to the pipe body.

A method for producing a refrigerant pipe according to a twenty-fifth aspect is the method for producing a refrigerant pipe according to any one of the sixteenth to twenty-fourth aspects, wherein the coating agent includes a volatile metalworking fluid.

In this method for producing a refrigerant pipe, the coating agent includes a volatile metalworking fluid and thus is more readily applied in a uniform manner than when the anticorrosive agent alone is applied.

A method for producing a refrigerant pipe according to a twenty-sixth aspect is the method for producing a refrigerant pipe according to the twenty-fifth aspect, wherein the method further includes a step of bending the refrigerant pipe coated with the coating agent at 180°.

In this method for producing a refrigerant pipe, the metalworking fluid is applied to the refrigerant pipe, thus facilitating folding processing for forming a refrigerant flow path for passing therethrough refrigerant.

DESCRIPTION OF EMBODIMENTS

Figure 1:
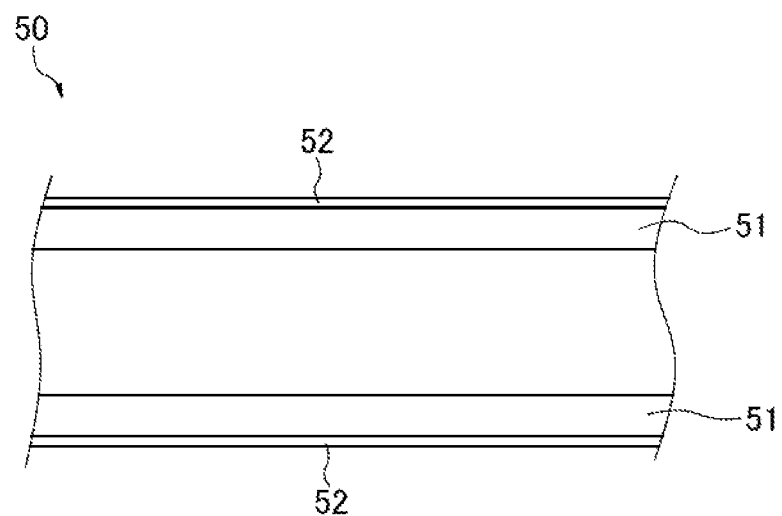
FIG. 1 is a schematic view of a refrigerant pipe.

Hereinafter, descriptions will be made with reference to embodiments of a refrigerant pipe, a method for producing a refrigerant pipe, and a heat exchanger.

(1) Refrigerant Pipe

A refrigerant pipe includes a pipe body and an anticorrosive film.

(2) Pipe Body

The pipe body is a cylindrical pipe and formed of copper or a copper alloy. Examples of the copper or the copper alloy includes pure copper, brass, and bronze. The copper alloy is preferably an alloy predominantly composed of copper.

(3) Anticorrosive Film

The anticorrosive film is formed by applying a coating agent to the outer surface of the pipe body.

The anticorrosive film is preferably obtained by drying the coating agent applied to the outer surface of the pipe body. To sufficiently fix the anticorrosive film to the pipe body, the drying is preferably heat drying by which the surface temperature is increased to 60° C. or higher and 200° C. or lower, and may be heat drying by which the surface temperature is increased to 130° C. or higher and 180° C. or lower.

The coating agent is obtained by dissolving an anticorrosive agent described below in a metalworking fluid. The method of dissolving the anticorrosive agent in the metalworking fluid is not particularly limited. For example, dispersion by stirring using a magnetic stirrer or the like may be employed.

The anticorrosive agent is one or more selected from the group consisting of (A) an organic sulfonate compound, (B) a polyhydric alcohol-organic acid ester compound, and (C) an aliphatic amine compound having 8 to 24 carbon atoms.

(3-1) (A) Organic Sulfonate Compound

Using an organic sulfonate compound as the anticorrosive agent enables suppression of corrosion of the pipe body.

The organic sulfonate compound is preferably a synthesized sulfonate compound represented by formula (III) below and/or a synthesized sulfonate compound represented by formula (IV) below.

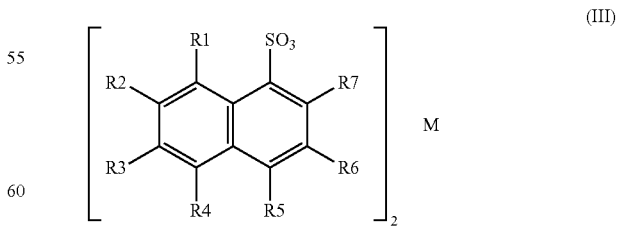

(III)

[In the above formula (III), R1 to R7 each independently represent hydrogen or an aliphatic hydrocarbon group having 4 to 12 carbon atoms (excluding the case where R1 to R7 are all hydrogen), and M represents Ca or Zn.]

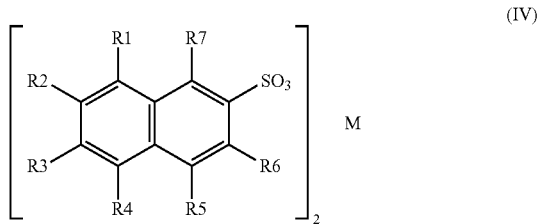

(IV)

[In the above formula (IV), R1 to R7 each independently represent hydrogen or an aliphatic hydrocarbon group having 4 to 12 carbon atoms (excluding the case where R1 to R7 are all hydrogen), and M represents Ca or Zn.]

The above synthesized sulfonate compounds can also suppress scattering of powder from the resulting coating film and can make the resulting coating film less odoriferous.

The synthesized sulfonate compounds represented by the above formulae (III) and (IV) have good solubility in a metalworking fluid described later because the case where R1 to R7 are all hydrogen is excluded.

In particular, calcium dinonylnaphthalene sulfonate is preferably included as the synthesized sulfonate compound.

The anticorrosive agent may consist of calcium dinonylnaphthalene sulfonate.

In the anticorrosive film formed on the outer surface of the pipe body, the above organic sulfonate compound is preferably included in an amount of 0.1 μg or more and 200.0 μg or less, more preferably included in an amount of 1.0 μg or more and 100.0 μg or less, still more preferably included in an amount of 1.0 μg or more and 10.0 μg or less, per square centimeter.

In the coating agent applied to the outer surface of the pipe body to form the anticorrosive film, the above organic sulfonate compound may be included in an amount of 0.1 wt % or more and 15.0 wt % or less, and is preferably included in an amount of 0.1 wt % or more and 8.0 wt % or less, more preferably included in an amount of 0.2 wt % or more and 5.0 wt % or less, still more preferably included in an amount of 0.5 wt % or more and 3.0 wt % or less. Within these ranges, a sufficient anticorrosive effect can be produced while the amount of the organic sulfonate compound used is small.

The presence of the organic sulfonate compound in the anticorrosive film constituting the outer surface of the refrigerant pipe can be confirmed by an analysis using a time-of-flight secondary ion mass spectrometer (TOF-SIMS).

(3-2) (B) Polyhydric Alcohol-Organic Acid Ester Compound

Using a polyhydric alcohol-organic acid ester compound as the anticorrosive agent enables suppression of corrosion of the pipe body.

The polyhydric alcohol-organic acid ester compound is preferably a glycerol fatty acid ester represented by formula (II) below.

R—COOCH$_2$—CH(OH)—CH$_2$OH    Formula (II)

[In the above formula (II), R represents a linear or branched aliphatic hydrocarbon group having 11 to 29 carbon atoms.]

The above polyhydric alcohol-organic acid ester compound can provide good solubility in a metalworking fluid described later, can also suppress scattering of powder from the resulting coating film, and can make the resulting coating film less odoriferous.

In particular, monoglyceryl oleate is preferably included as the polyhydric alcohol-organic acid ester compound.

The anticorrosive agent may consist of monoglyceryl oleate.

In the anticorrosive film formed on the outer surface of the pipe body, the above polyhydric alcohol-organic acid ester compound is preferably included in an amount of 0.1 μg or more and 200.0 μg or less, more preferably included in an amount of 1.0 μg or more and 150.0 μg or less, still more preferably included in an amount of 10.0 μg or more and 100.0 μg or less, per square centimeter.

In the coating agent applied to the outer surface of the pipe body to form the anticorrosive film, the above polyhydric alcohol-organic acid ester compound is preferably included in an amount of 0.1 wt % or more and 10.0 wt % or less, more preferably included in an amount of 0.2 wt % or more and 8.0 wt % or less, still more preferably included in an amount of 1.0 wt % or more and 5.0 wt % or less.

In an analysis using a time-of-flight secondary ion mass spectrometer (TOF-SIMS), the polyhydric alcohol-organic acid ester compound present in the anticorrosive film is detected as a corresponding organic acid. For example, in the case of monoglyceryl oleate ($C_{21}H_{40}O_4$), oleic acid ($C_{18}H_{33}O_2^-$) is detected.

When a coating agent in which the polyhydric alcohol-organic acid ester compound is contained as the anticorrosive agent is used, it is preferred that (D) a succinic anhydride derivative represented by formula (I) below be further contained as the anticorrosive agent in order to produce a greater anticorrosive effect.

(I)

[In the above formula (I), R represents a linear or branched aliphatic hydrocarbon group having 8 to 24 carbon atoms.]

When (B) the polyhydric alcohol-organic acid ester compound and (D) the succinic anhydride derivative are used in combination, the composition ratio thereof in the coating agent (also in the anticorrosive film) is preferably in the range of 1:4 to 4:1, more preferably in the range of 1:2 to 2:1. In the case of the combined use, (D) the succinic anhydride derivative is included in the coating agent preferably in an amount of 1.0 wt % or more and 10.0 wt % or less, preferably in an amount of 2.0 wt % or more and 8.0 wt % or less.

In an analysis using a time-of-flight secondary ion mass spectrometer (TOF-SIMS), (D) the succinic anhydride derivative present in the anticorrosive film is detected as a corresponding succinic acid derivative. For example, in the case of octadecenylsuccinic anhydride ($C_{22}H_{38}O_3$), octadecenylsuccinic acid ($C_{22}H_{39}O_4^-$) is detected.

When a coating agent in which (B) the polyhydric alcohol-organic acid ester compound is contained as the anticorrosive agent is used, in order to produce a greater anticorrosive effect, (C) an aliphatic amine compound having 8 to 24 carbon atoms describe later, if contained in the coating agent (also in the anticorrosive film), is present preferably in an amount less than the amount of (B) the polyhydric alcohol-organic acid ester compound, more preferably in an amount not more than half the amount of (B) the polyhydric alcohol-organic acid ester compound, still more preferably in an amount not more than ⅕ of the amount of (B) the polyhydric alcohol-organic acid ester compound.

Particularly preferably, (C) the aliphatic amine compound having 8 to 24 carbon atoms is not contained.

In the coating agent applied to the outer surface of the pipe body to form the anticorrosive film, (B) the polyhydric alcohol-organic acid ester compound above is preferably contained together with (A) the organic sulfonate compound described above. In particular, monoglyceryl oleate serving as (B) the polyhydric alcohol-organic acid ester compound and calcium dinonylnaphthalene sulfonate serving as (A) the organic sulfonate compound are preferably contained together.

(3-3) (C) Aliphatic Amine Compound Having 8 to 24 Carbon Atoms

When an aliphatic amine compound having 8 to 24 carbon atoms is used, it is contained in an amount of 1.5 wt % or more and 10.0 wt % or less in the coating agent applied to the outer surface of the pipe body to form the anticorrosive film or included in an amount of 1.5 μg or more and 200.0 μg or less per square centimeter in the anticorrosive film, whereby corrosion of the pipe body can be suppressed.

The above aliphatic amine compound having 8 to 24 carbon atoms can provide good solubility in a metalworking fluid described later, can also suppress scattering of powder from the resulting coating film, and can make the resulting coating film less odoriferous.

In particular, oleylamine is preferably included as the aliphatic amine compound having 8 to 24 carbon atoms.

The anticorrosive agent may consist of oleylamine.

In the anticorrosive film formed on the outer surface of the pipe body, the above aliphatic amine compound having 8 to 24 carbon atoms is preferably included in an amount of 50.0 μg or more and 150.0 μg or less per square centimeter, preferably included in an amount of 70.0 μg or more and 100.0 μg or less per square centimeter.

In the coating agent applied to the outer surface of the pipe body to form the anticorrosive film, the above aliphatic amine compound having 8 to 24 carbon atoms is preferably included in an amount of 3.0 wt % or more and 8.0 wt % or less, more preferably included in an amount of 4.0 wt % or more and 6.0 wt % or less.

The presence of the aliphatic amine compound having 8 to 24 carbon atoms in the anticorrosive film constituting the outer surface of the refrigerant pipe can be confirmed by an analysis using a time-of-flight secondary ion mass spectrometer (TOF-SIMS).

When a coating agent in which the aliphatic amine compound having 8 to 24 carbon atoms is contained as the anticorrosive agent is used, it is preferred that (D) a succinic anhydride derivative represented by formula (I) below be further contained as the anticorrosive agent in order to produce a greater anticorrosive effect.

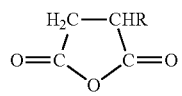

[In the above formula (I), R represents a linear or branched aliphatic hydrocarbon group having 8 to 24 carbon atoms.]

When (C) the aliphatic amine compound having 8 to 24 carbon atoms and (D) the succinic anhydride derivative are used in combination, the composition ratio thereof in the coating agent (also in the anticorrosive film) is preferably in the range of 1:4 to 4:1, more preferably in the range of 1:2 to 2:1. In the case of the combined use, (D) the succinic anhydride derivative is included in the coating agent preferably in an amount of 1.0 wt % or more and 10.0 wt % or less, preferably in an amount of 2.0 wt % or more and 8.0 wt % or less.

When a coating agent in which (C) the aliphatic amine compound having 8 to 24 carbon atoms is contained as the anticorrosive agent is used, in order to produce a greater anticorrosive effect, (B) the polyhydric alcohol-organic acid ester compound, if contained in the coating agent (also in the anticorrosive film), is present preferably in an amount less than the amount of (C) the aliphatic amine compound having 8 to 24 carbon atoms, more preferably in an amount not more than half the amount of (C) the aliphatic amine compound having 8 to 24 carbon atoms, still more preferably in an amount not more than ⅕ of the amount of (C) the aliphatic amine compound having 8 to 24 carbon atoms. Particularly preferably, (B) the polyhydric alcohol-organic acid ester compound is not contained.

In the coating agent applied to the outer surface of the pipe body to form the anticorrosive film, (C) the aliphatic amine compound having 8 to 24 carbon atoms above is preferably contained together with (A) the organic sulfonate compound described above. In particular, oleylamine serving as (C) the aliphatic amine compound having 8 to 24 carbon atoms and calcium dinonylnaphthalene sulfonate serving as (A) the organic sulfonate compound are preferably contained together.

(3-4) Metalworking Fluid

The metalworking fluid is not particularly limited and is preferably a working fluid that is used for metal processing and that does not erode (is less likely to rust) metals such as aluminum and copper.

The metalworking fluid is preferably volatilized at 180° C. or higher under atmospheric pressure so as to be substantially eliminated by heat drying after processing. When the metalworking fluid can be substantially eliminated by heat drying after processing as described above, formation of organic substances such as formic acid that may be formed due to deterioration or decomposition of residues can be suppressed, and ant-nest-like corrosion likely to occur due to such organic substances can be suppressed.

If the anticorrosive agent alone is applied to the pipe body, the application efficiency is low because the material loss during processing is likely to occur due to high viscosity, and it is difficult to form a uniform coating film. Thus, the anticorrosive agent is preferably applied in the form of a solution in the metalworking fluid.

The kinematic viscosity at 40° C. of the metalworking fluid is preferably 1.0 mm²/s or more and 5.0 mm²/s or less, more preferably 1.2 mm²/s or more and 2.5 mm²/s or less. The kinematic viscosity is measured in accordance with JIS K2283.

The density at 15° C. of the metalworking fluid is preferably 0.75 g/cm³ or more and 0.79 g/cm³ or less. The density is measured in accordance with JIS K2249.

The metalworking fluid preferably has an acid value of 0 mgKOH/g. Such a metalworking fluid preferably does not include a lower carboxylic acid such as formic acid or acetic acid.

The above metalworking fluid may be a commercially available product. Examples of such commercially available products include Daphne Punch Oil AF-A series available from Idemitsu Kosan Co., Ltd. and Proformer series available from N·S LUBRICANTS CO., LTD. Of these, "AF-2A" and "AF-2AS" (trade names) available from Idemitsu Kosan Co., Ltd. and "Proformer RF520" and "Proformer RF510" (trade names) available from N·S LUBRICANTS CO., LTD. are more preferred, and "AF-2A" (trade name) available from Idemitsu Kosan Co., Ltd. is particularly preferred.

(4) Methods for Producing Refrigerant Pipe and Heat Exchanger

The refrigerant pipe is produced, for example, as described below.

First, the pipe body formed of copper or a copper alloy, the anticorrosive agent, and the metalworking fluid described above are provided.

The provided anticorrosive agent is dissolved in the metalworking fluid to obtain a coating agent.

The coating agent is applied to the outer surface of the pipe body to form an anticorrosive film.

FIG. 1 illustrates a sectional view of a refrigerant pipe 50 obtained as described above. The refrigerant pipe 50 includes a cylindrical pipe body 51 and an anticorrosive film 52 formed on the outer surface of the pipe body 51.

The coating agent may be applied to the outer surface of the provided pipe body without any treatment or may be applied after the outer surface of the pipe body is pretreated. One example of the pretreatment of the pipe body is a degreasing treatment. When the degreasing treatment is performed, a solvent such as acetone, an alkaline liquid, or the metalworking fluid described in (3-4) may be used.

To form the anticorrosive film, the coating agent applied to the outer surface of the pipe body may be dried by heating.

The thickness of the anticorrosive film to be formed is not particularly limited. The thickness may be, for example, 1 nm or more and 5000 nm or less, and is preferably 10 nm or more and 1000 nm or less.

The refrigerant pipe can be used as a pipe through which refrigerant is flowed and may be used at any position in a refrigerant circuit. For example, the refrigerant pipe may be used as a heat transfer tube of a heat exchanger (particularly, a heat transfer tube of a heat exchanger serving as an evaporator for refrigerant) or as a connecting pipe for connecting together principal components (e.g., a compressor, an expansion valve, and a heat exchanger) of the refrigerant circuit.

When the refrigerant pipe is used as a heat transfer tube of a heat exchanger of an air conditioner, dew condensation water may be scattered if the surface of a heat transfer fin has water-repellency. To suppress such scattering, the above coating agent is preferably not applied to the heat transfer fin through which the heat transfer tube passes, and the anticorrosive agent is preferably not present on the surface of the heat transfer fin. Hereinafter, a method for producing a heat exchanger in the case where the refrigerant pipe is used as a heat transfer tube of the heat exchanger of an air conditioner will be described.

Figure 2:
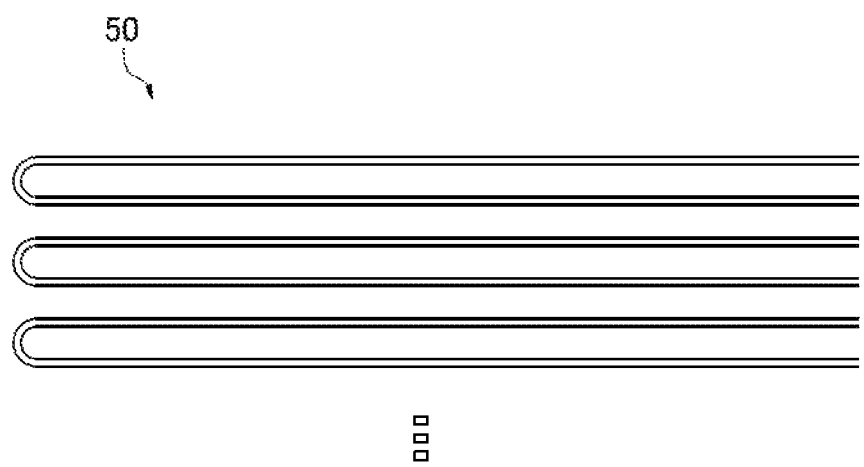
FIG. 2 is a schematic view of a bent refrigerant pipe.

First, the coating agent obtained by dissolving the anticorrosive agent in the metalworking fluid is applied to the outer surface of the pipe body 51. The refrigerant pipe 50 thus coated with the coating agent (the coating agent including the metalworking fluid is undried) is then bent at 180° as illustrated in FIG. 2 to form a hairpin-shaped refrigerant pipe 50. A plurality of such hairpin-shaped refrigerant pipes 50 are arranged side by side.

Figure 3:
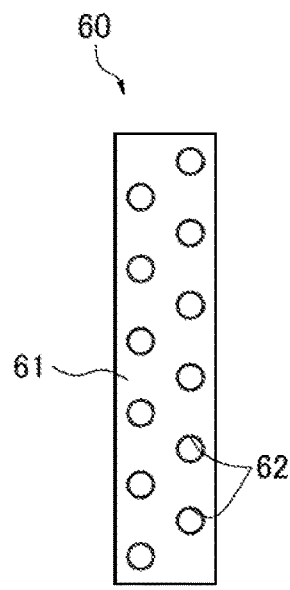
FIG. 3 is a schematic view of a heat transfer fin.

Here, a plate-shaped heat transfer fin 60 as illustrated in FIG. 3 is provided. The heat transfer fin 60 includes a fin body 61 and has a plurality of holes 62 formed so as to extend through the fin body 61 along the thickness direction of the fin body 61 in order to pass therethrough the plurality of refrigerant pipes 50. The heat transfer fin 60 is formed of, for example, aluminum or an aluminum alloy. The metalworking fluid is applied to the heat transfer fin 60. The metalworking fluid applied to the heat transfer fin 60 is not particularly limited and may be the same as the metalworking fluid constituting the above-described coating agent.

Figure 4:
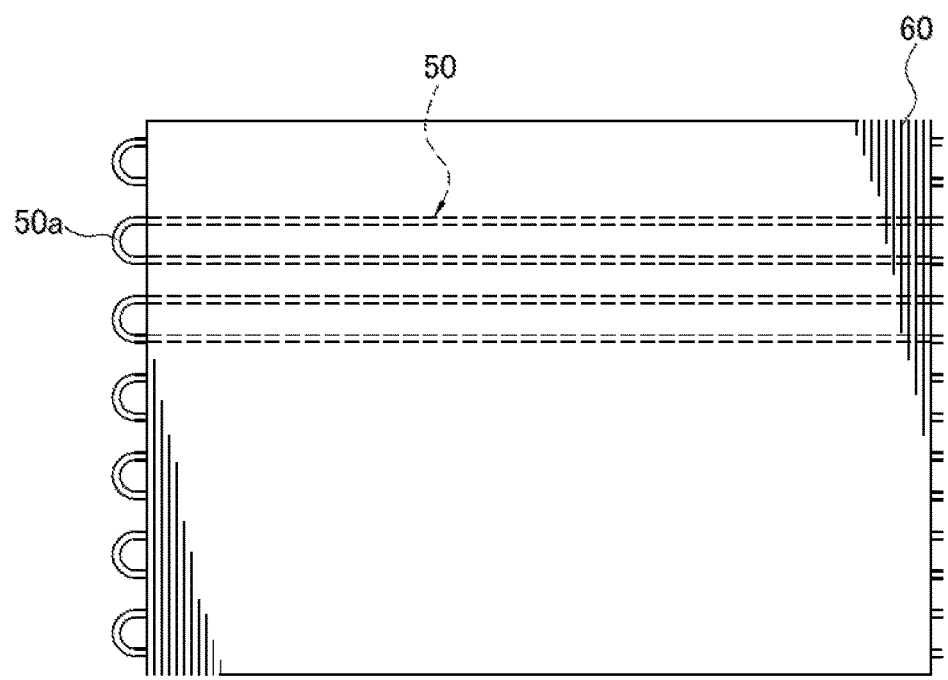
FIG. 4 is a schematic view illustrating a heat exchanger before bonding of U-shaped pipes.

A plurality of heat transfer fins 60 to which the metalworking fluid is applied are slipped, as illustrated in FIG. 4, over the plurality of hairpin-shaped refrigerant pipes 50 arranged side by side. Here, after all the plurality of heat transfer fins 60 are slipped, the refrigerant pipes 50 serving as heat transfer tubes are expanded from inside so as to have an increased inside diameter. As a result, the outer diameter of the refrigerant pipes 50 coincides with the inside diameter of the holes 62 of the heat transfer fins 60, and each refrigerant pipe 50 and each heat transfer fin 60 come into close contact with each other.

The plurality of refrigerant pipes 50 and the plurality of heat transfer fins 60 obtained as described above are dried by heating. The surface temperature of the refrigerant pipes 50 and the heat transfer fins 60 during the heat drying is not particularly limited. For example, the surface temperature is preferably 60° C. or higher and 200° C. or lower and may be 130° C. or higher and 180° C. or lower. Here, the metalworking fluid in the coating agent applied to the surface of the pipe body 51 of each refrigerant pipe 50 is substantially eliminated, for example, through volatilization. The metalworking fluid applied to the surface of the heat transfer fins 60 is also substantially eliminated, for example, through volatilization.

Figure 5:
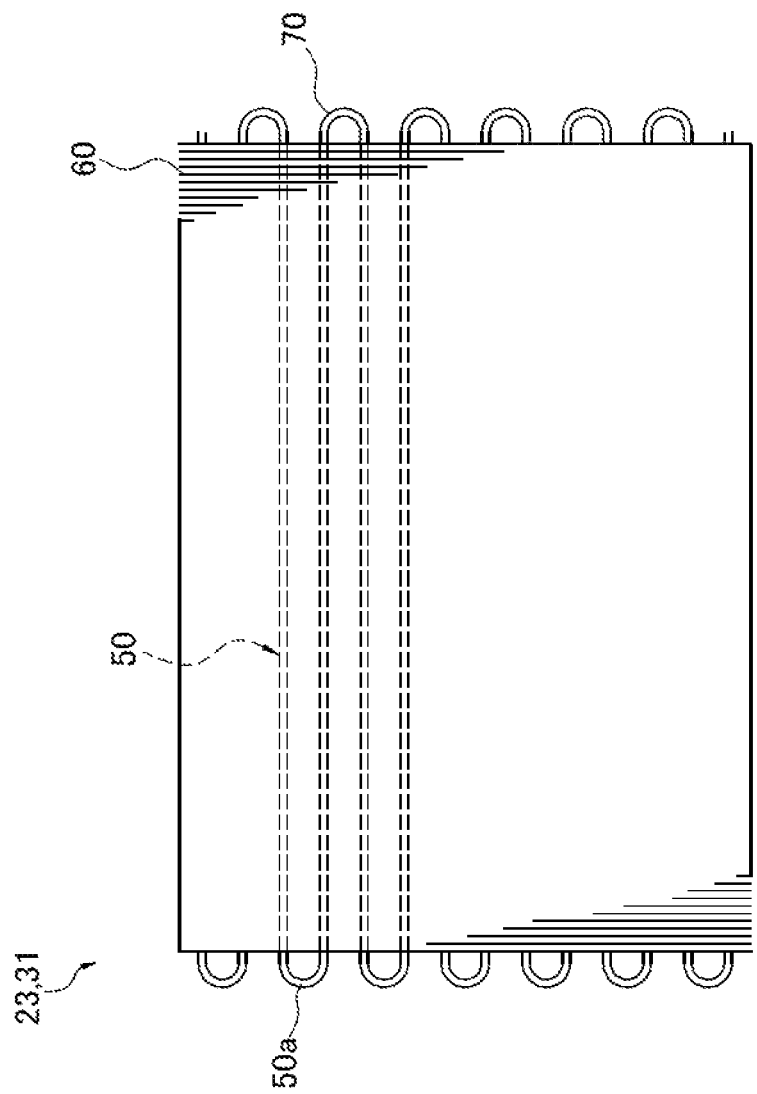
FIG. 5 is a schematic view illustrating a heat exchanger after bonding of U-shaped pipes.

For a structure taken out of a furnace, a plurality of U-shaped pipes 70 are bonded by brazing to a plurality of ends opposite to bent portions 50a of the refrigerant pipes 50, as illustrated in FIG. 5. The heat exchangers thus obtained (heat exchangers 23 and 31 described later) will constitute a part of a refrigerant circuit of an air conditioner.

(5) Air Conditioner Including Heat Exchanger Including Refrigerant Pipe

Figure 6:
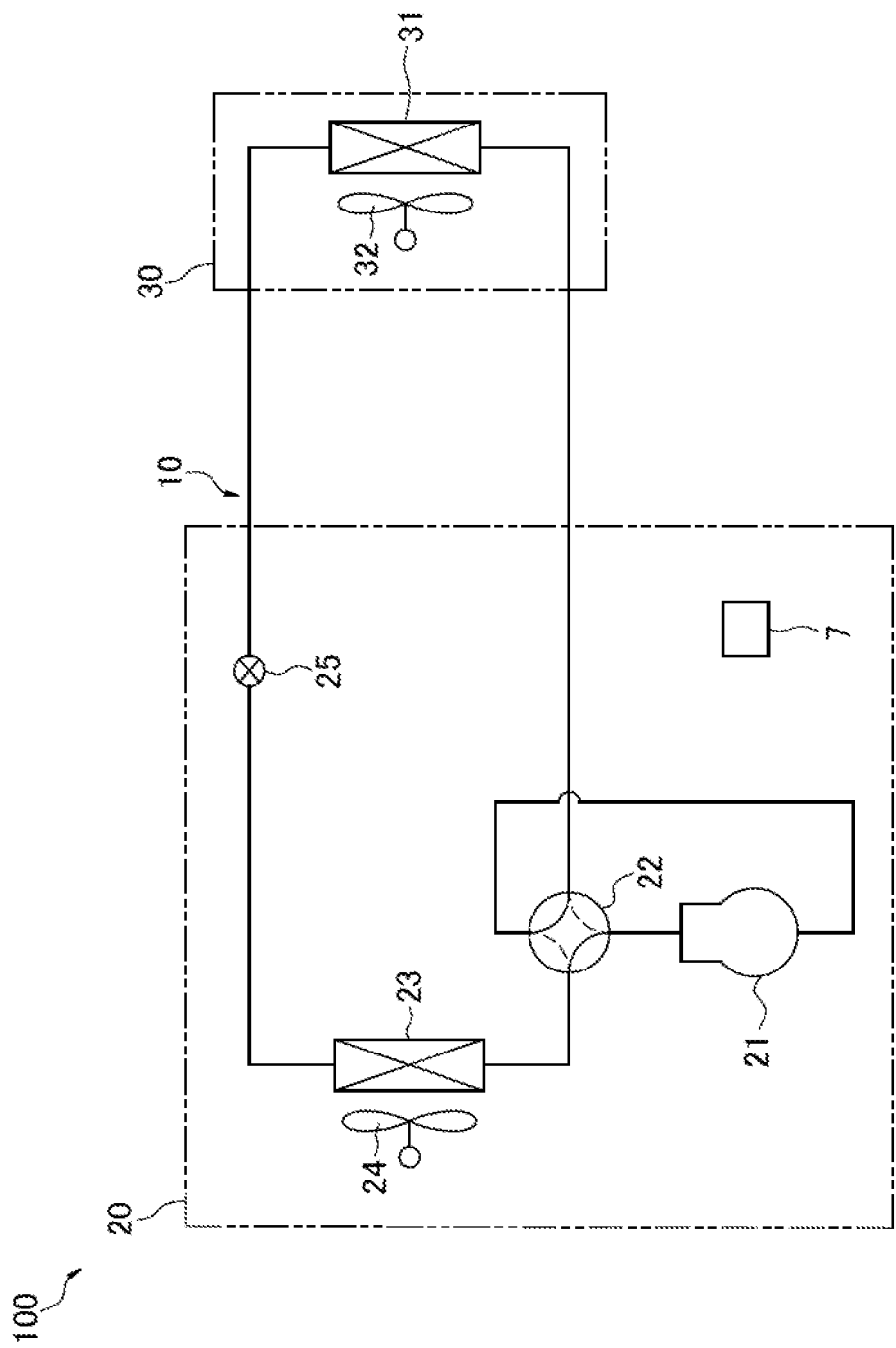
FIG. 6 is a schematic diagram of an air conditioner.

An example of an air conditioner 100 including heat exchangers 23 and 31 each including the above-described refrigerant pipe will be described below with reference to FIG. 6.

The air conditioner 100 includes a refrigerant circuit 10, an outdoor fan 24, an indoor fan 32, a control unit 7, etc.

The refrigerant circuit 10 includes a compressor 21, a four-way switching valve 22, an outdoor heat exchanger 23, an expansion valve 25, and an indoor heat exchanger 31. The refrigerant circuit 10 can switch between cooling operation and heating operation in response to a switch of the state of connection of the four-way switching valve 22.

The indoor heat exchanger 31 and the indoor fan 32 are disposed inside an indoor unit 30 installed in a space to be air-conditioned. The compressor 21, the four-way switching valve 22, the outdoor heat exchanger 23, the expansion valve 25, the outdoor fan 24, and the control unit 7 are disposed inside an outdoor unit 20 installed out of the space to be air-conditioned.

During cooling operation, a refrigerant discharged from the compressor 21 passes through one of connection ports of the four-way switching valve 22 and is then sent to the outdoor heat exchanger 23 that functions as a radiator for the refrigerant. The refrigerant that has radiated heat in the outdoor heat exchanger 23 is decompressed when passing through the expansion valve 25 and sent to the indoor heat exchanger 31 that functions as an evaporator for the refrigerant. The refrigerant evaporated in the indoor heat exchanger 31 passes through another one of the connection ports of the four-way switching valve 22 and is sucked into the compressor 21 again.

During heating operation, a refrigerant discharged from the compressor 21 passes through one of the connection ports of the four-way switching valve 22 and is then sent to the indoor heat exchanger 31 that functions as a radiator for the refrigerant. The refrigerant that has radiated heat in the indoor heat exchanger 31 is decompressed when passing through the expansion valve 25 and sent to the outdoor heat exchanger 23 that functions as an evaporator for the refrigerant. The refrigerant evaporated in the outdoor heat exchanger 23 passes through another one of the connection ports of the four-way switching valve 22 and is sucked into the compressor 21 again.

The control unit 7 controls the drive frequency of the compressor 21, the opening degree of the expansion valve 25, the quantity of air supplied by the outdoor fan 24, the quantity of air supplied by the indoor fan 32, and the like on the basis of information detected by various sensors (not illustrated).

EXAMPLES

Examples and Comparative Examples of refrigerant pipes will be described below, but the present invention is not limited thereto.

Examples 1a to 1c

In Examples 1a to 1c, calcium dinonylnaphthalene sulfonate serving as (A) an organic sulfonate compound was used as an anticorrosive agent. A coating agent obtained by dissolving the anticorrosive agent in AF-2A (trade name) available from Idemitsu Kosan Co., Ltd. serving as a metalworking fluid was applied (by immersion for 10 seconds) to the outer surface of a tube of phosphorous-deoxidized copper available from Kobelco & Materials Copper Tube Co., Ltd. serving as a pipe body. Drying was performed for 5 minutes in an environment at 70° C. to obtain a refrigerant pipe.

The example in which the weight percentage of calcium dinonylnaphthalene sulfonate in the coating agent was 5.0 wt % was Example 1a; the example in which the weight percentage was 1.0 wt % was Example 1b; and the example in which the weight percentage was 0.2 wt % was Example 1c.

Examples 2a to 2c

In Examples 2a to 2c, a refrigerant pipe was obtained in the same manner as in Examples 1a to 1c except that monoglyceryl oleate serving as (B) a polyhydric alcohol-organic acid ester compound was used as an anticorrosive agent.

The example in which the weight percentage of monoglyceryl oleate in the coating agent was 5.0 wt % was Example 2a; the example in which the weight percentage was 1.0 wt % was Example 2b; and the example in which the weight percentage was 0.2 wt % was Example 2c.

Examples 3a to 3c

In Examples 3a to 3c, a refrigerant pipe was obtained in the same manner as in Examples 1a to 1c except that oleylamine serving as (C) an aliphatic amine compound having 8 to 24 carbon atoms was used as an anticorrosive agent.

The example in which the weight percentage of oleylamine in the coating agent was 5.0 wt % was Example 3a; the example in which the weight percentage was 1.0 wt % was Example 3b; and the example in which the weight percentage was 0.2 wt % was Example 3c.

Reference Example 1

In Reference Example 1, a refrigerant pipe was obtained in the same manner as in Examples 1a to 1c except that OA-386 (trade name) available from Daiwa Fine Chemicals Co., Ltd. serving as a benzotriazole compound was used as an anticorrosive agent.

The weight percentage of the benzotriazole compound in the coating agent was 0.3 wt %.

Comparative Examples 1a to 1c

In Comparative Examples 1a to 1c, a refrigerant pipe was obtained in the same manner as in Examples 1a to 1c except that octadecenylsuccinic anhydride serving as (D) a specific succinic anhydride derivative was used as an anticorrosive agent.

The example in which the weight percentage of octadecenylsuccinic anhydride in the coating agent was 5.0 wt % was Comparative Example 1a; the example in which the weight percentage was 1.0 wt % was Comparative Example 1b; and the example in which the weight percentage was 0.2 wt % was Comparative Example 1c.

Comparative Example 2

In Comparative Example 2, a refrigerant pipe was obtained in the same manner as in Examples 1a to 1c except that no anticorrosive agents were contained.
(Corrosiveness Evaluation Test)

Figure 7:
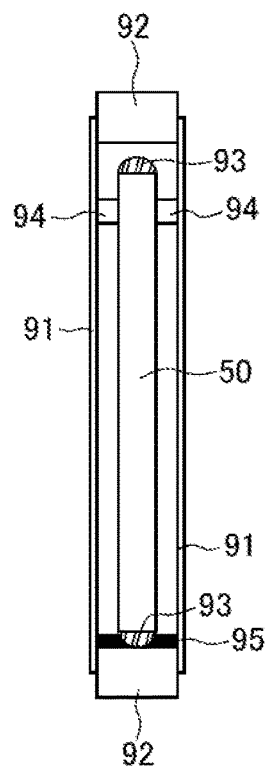
FIG. 7 illustrates how a corrosiveness evaluation test is performed.

For each of these Examples 1a to 1c, 2a to 2c, and 3a to 3c, Reference Example 1, Comparative Examples 1a to 1c, and Comparative Example 2, a test for evaluating the degree of occurrence of corrosion upon exposure to an environment illustrated in FIG. 7 was performed.

As illustrated in FIG. 7, a sample refrigerant pipe 50 of each of Examples 1a to 1c, 2a to 2c, and 3a to 3c, Reference Example 1, Comparative Examples 1a to 1c, and Comparative Example 2 was placed in a cylindrical glass tube 91, and the upper and lower ends of the glass tube 91 were hermetically sealed with silicone caps. To prevent corrosion inside the tube, both longitudinal ends of the refrigerant pipe 50 were hermetically sealed with hot-melt resins 93. A sealing tape 94 made of PTFE was applied around an upper part of the refrigerant pipe 50 to fix the refrigerant pipe 50 to the glass tube 91. In the hermetically sealed space (inside the glass tube 91 and outside the refrigerant pipe 50), an aqueous formic acid solution 95 with a formic acid concentration of 1000 ppm was placed. Under the above conditions, the refrigerant pipe 50 was exposed at normal temperature.

For Comparative Example 2 in which no anticorrosive agents were used, after the lapse of 3 days, discoloration was observed throughout the gas-liquid interface of the refrigerant pipe, and the occurrence of ant-nest-like corrosion was observed. For Comparative Examples 1a to 1c and Reference Example 1, after the lapse of 11 days, discoloration was observed at the gas phase portion of the refrigerant pipe, and the occurrence of ant-nest-like corrosion was observed. For Examples 1a to 1c, after the lapse of 11 days, discoloration was observed in Example 1c; discoloration was slight in Examples 1a and 1b; and the occurrence of ant-nest-like corrosion was not observed in any of Examples 1a to 1c. For Examples 2a to 2c, after the lapse of 11 days, discoloration occurred at the liquid phase portion in each of Examples 2a to 2c, but the occurrence of ant-nest-like corrosion was not observed in any of Examples 2a to 2c. For Examples 3a to 3c, after the lapse of 11 days, discoloration was observed in Example 3c; discoloration was slight in Examples 3a and 3b; and the occurrence of ant-nest-like corrosion was not observed in any of Examples 3a to 3c.

Examples 4a to 4c

In Example 4a, an anticorrosive agent including 5.0 wt % of octadecenylsuccinic anhydride serving as (D) a specific succinic anhydride derivative and 5.0 wt % of monoglyceryl oleate serving as (B) a polyhydric alcohol-organic acid ester compound was used. A coating agent obtained by dissolving the anticorrosive agent in AF-2A (trade name) available from Idemitsu Kosan Co., Ltd. serving as a metalworking fluid was applied (by immersion for 10 seconds) to the outer surface of a tube of phosphorous-deoxidized copper available from Kobelco & Materials Copper Tube Co., Ltd. serving as a pipe body. Drying was performed for 5 minutes in an environment at 70° C. to obtain a refrigerant pipe.

In Example 4b, an anticorrosive agent including 5.0 wt % of octadecenylsuccinic anhydride serving as (D) a specific succinic anhydride derivative and 5.0 wt % of oleylamine serving as (C) an aliphatic amine compound having 8 to 24 carbon atoms was used. A coating agent obtained by dissolving the anticorrosive agent in AF-2A (trade name) available from Idemitsu Kosan Co., Ltd. serving as a metalworking fluid was applied (by immersion for 10 seconds) to the outer surface of a tube of phosphorous-deoxidized copper available from Kobelco & Materials Copper Tube Co., Ltd. serving as a pipe body. Drying was performed for 5 minutes in an environment at 70° C. to obtain a refrigerant pipe.

In Example 4c, a refrigerant pipe was obtained in the same manner as in Example 4a except that an anticorrosive agent including 5.0 wt % of monoglyceryl oleate serving as (B) a polyhydric alcohol-organic acid ester compound and 5.0 wt % of oleylamine serving as (C) an aliphatic amine compound having 8 to 24 carbon atoms was used.

For these Examples 4a to 4c, the same corrosiveness evaluation test as above was performed. After the lapse of 11 days, discoloration was slight in each of Examples 4a and 4c, and the occurrence of ant-nest-like corrosion was not observed in any of Examples 4a to 4c.

Examples 5a-1, 5a-2, 5a-3, 5a-4, 5b-1, 5b-2, 5c-1, 5d, 5e, 5f, 5g, 5h, and 5i, Comparative Example 3, Reference Example 2, Reference Example 3, and Comparative Example 4

In Examples 5a-1, 5a-2, 5a-3, and 5a-4, calcium dinonylnaphthalene sulfonate serving as (A) an organic sulfonate compound was used as an anticorrosive agent. A coating agent obtained by dissolving the anticorrosive agent in AF-2A (trade name) available from Idemitsu Kosan Co., Ltd. serving as a metalworking fluid was applied (by immersion for 10 seconds) to the outer surface of a tube of phosphorous-deoxidized copper available from Kobelco & Materials Copper Tube Co., Ltd. serving as a pipe body. Drying was performed for 5 minutes in an environment at 70° C. to obtain a refrigerant pipe. The example in which the weight percentage of calcium dinonylnaphthalene sulfonate in the coating agent was 1.0 wt % was Example 5a-1; the example in which the weight percentage was 8.0 wt % was Example 5a-2; the example in which the weight percentage was 2.0 wt % was Example 5a-3; and the example in which the weight percentage was 0.1 wt % was Example 5a-4.

In Examples 5b-1 and 5b-2, a refrigerant pipe was obtained in the same manner as in Example 5a-1 except that monoglyceryl oleate serving as (B) a polyhydric alcohol-organic acid ester compound was used as an anticorrosive agent. The example in which the weight percentage of monoglyceryl oleate in the coating agent was 5.0 wt % was Example 5b-1, and the example in which the weight percentage was 1.0 wt % was Example 5b-2.

In Example 5c-1 and Comparative Example 3, a refrigerant pipe was obtained in the same manner as in Example 5a-1 except that oleylamine serving as (C) an aliphatic amine compound having 8 to 24 carbon atoms was used as an anticorrosive agent. The example in which the weight percentage of oleylamine in the coating agent was 5.0 wt % was Example 5c-1, and the example in which the weight percentage was 1.0 wt % was Comparative Example 3.

In Example 5d, a refrigerant pipe was obtained in the same manner as in Example 5a-1 except that an anticorrosive agent including 5.0 wt % of octadecenylsuccinic anhydride serving as (D) a specific succinic anhydride derivative and 5.0 wt % of monoglyceryl oleate serving as (B) a polyhydric alcohol-organic acid ester compound was used.

In Example 5e, a refrigerant pipe was obtained in the same manner as in Example 5a-1 except that an anticorrosive agent including 5.0 wt % of octadecenylsuccinic anhydride serving as (D) a specific succinic anhydride derivative and 5.0 wt % of oleylamine serving as (C) an aliphatic amine compound having 8 to 24 carbon atoms was used.

In Example 5f, a refrigerant pipe was obtained in the same manner as in Example 5a-1 except that an anticorrosive agent including 5.0 wt % of monoglyceryl oleate serving as (B) a polyhydric alcohol-organic acid ester compound and 5.0 wt % of oleylamine serving as (C) an aliphatic amine compound having 8 to 24 carbon atoms was used.

In Example 5g, a refrigerant pipe was obtained in the same manner as in Example 5a-1 except that an anticorrosive agent including 1.5 wt % of calcium dinonylnaphthalene sulfonate serving as (A) an organic sulfonate compound and 1.5 wt % of monoglyceryl oleate serving as (B) a polyhydric alcohol-organic acid ester compound was used.

In Example 5h, a refrigerant pipe was obtained in the same manner as in Example 5a-1 except that an anticorrosive agent including 0.1 wt % of calcium dinonylnaphthalene sulfonate serving as (A) an organic sulfonate compound and 5.0 wt % of oleylamine serving as (C) an aliphatic amine compound having 8 to 24 carbon atoms was used.

In Example 5i, a refrigerant pipe was obtained in the same manner as in Example 5a-1 except that an anticorrosive agent including 1.5 wt % of calcium dinonylnaphthalene sulfonate serving as (A) an organic sulfonate compound and 1.5 wt % of oleylamine serving as (C) an aliphatic amine compound having 8 to 24 carbon atoms was used.

In Reference Examples 2 and 3, a refrigerant pipe was obtained in the same manner as in Example 5a-1 except that OA-386 (trade name) available from Daiwa Fine Chemicals Co., Ltd. serving as a benzotriazole compound was used as an anticorrosive agent. The example in which the weight percentage of the benzotriazole compound in the coating agent was 0.3 wt % was Reference Example 2, and the example in which the weight percentage was 1.0 wt % was Reference Example 3.

In Comparative Example 4, a refrigerant pipe was obtained in the same manner as in Examples 5a-1 except that no anticorrosive agents were contained.

(Partial Immersion Test)

Figure 8:
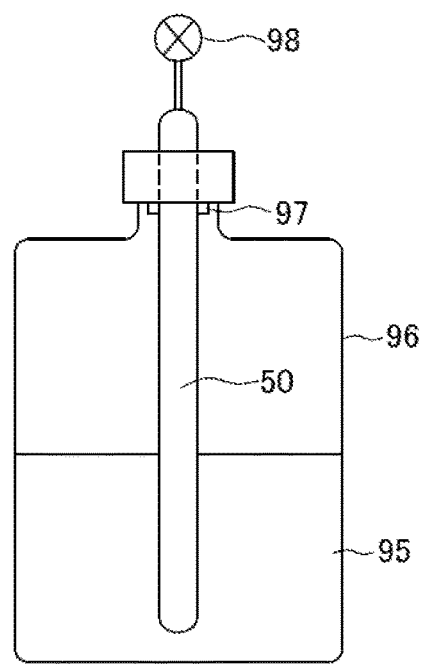
FIG. 8 illustrates how a partial immersion test is performed.

For each of these Examples 5a-1, 5a-2, 5a-3, 5a-4, 5b-1, 5b-2, 5c-1, 5d, 5e, 5f, 5g, 5h, and 5i, Comparative Examples 3 and 4, and Reference Examples 2 and 3, a test for evaluating the degree of occurrence of corrosion upon exposure to an environment illustrated in FIG. 8 was performed.

As illustrated in FIG. 8, a sample refrigerant pipe 50 (closed at both its ends and filled with pressurized air) of each of Examples 5a-1, 5a-2, 5a-3, 5a-4, 5b-1, 5b-2, 5c-1, 5d, 5e, 5f, 5g, 5h, and 5i, Comparative Examples 3 and 4, and Reference Examples 2 and 3 was placed in a cylindrical 500 ml resin bottle 96 having an open top end, and the top end of the resin bottle 96 was hermetically sealed with a silicone cap. To prevent corrosion inside the bottle, the top end of the refrigerant pipe 50 was hermetically sealed with a hot-melt resin 97. In the hermetically sealed space (inside the resin bottle 96 and outside the refrigerant pipe 50), 300 ml of an aqueous formic acid solution 95 with a formic acid concentration of 1000 ppm was placed. Under the above conditions, the refrigerant pipe 50 was exposed in an environment at 40° C. To determine the timing at which a through-hole was formed in the refrigerant pipe 50 (the timing at which a decrease in pressure was observed), the internal pressure of the refrigerant pipe 50 filled with pressurized air was observed using a pressure gauge 98.

In Comparative Example 4, the occurrence of a through-hole (a decrease in pressure) was observed after the lapse of 87.5 hours from the start of the test. In Reference Example 2, the occurrence of a through-hole was observed after the lapse of 84.5 hours from the start of the test, which was at the same level as Comparative Example 4. In Example 5a-1, the occurrence of a through-hole was observed after the lapse of 823.5 hours from the start of the test. In Example 5a-2, the occurrence of a through-hole was not observed even after the lapse of 800.0 hours from the start of the test. In Example 5a-3, the occurrence of a through-hole was not observed even after the lapse of 800.0 hours from the start of the test. In Example 5a-4, the occurrence of a through-hole was observed after the lapse of 88.8 hours from the start of the test. In Example 5b-1, the occurrence of a through-hole was observed after the lapse of 584.9 hours from the start of the test. In Example 5b-2, the occurrence of a through-hole was observed after the lapse of 134.2 hours from the start of the test. In Example 5c-1, the occurrence of a through-hole was observed after the lapse of 161.8 hours from the start of the test. In Comparative Example 3, the occurrence of a through-hole was observed after the lapse of 78.5 hours from the start of the test, which was at the same level as Comparative Example 4 and Reference Example 2. In Example 5d, the occurrence of a through-hole was not observed after the lapse of 500 hours from the start of the test. In Example 5e, the occurrence of a through-hole was not observed after the lapse of 500 hours from the start of the test. In Example 5f, the occurrence of a through-hole was observed after the lapse of 153.5 hours from the start of the test. In Example 5g, the occurrence of a through-hole was not observed even after the lapse of 800.0 hours from the start of the test. In Example 5h, the occurrence of a through-hole was observed after the lapse of 304.2 hours from the start of the test. In Example 5i, the occurrence of a through-hole was not observed even after the lapse of 800.0 hours from the start of the test.

Comparison of Examples 5a-4, 5c-1, and 5h shows that the anticorrosive effect is greater when (A) an organic sulfonate compound and (C) an aliphatic amine compound having 8 to 24 carbon atoms are used in combination than when (A) the organic sulfonate compound is used alone or when (C) the aliphatic amine compound having 8 to 24 carbon atoms is used alone.

The embodiments of the present disclosure have been described, but it should be understood that configurations and details can be modified in various ways without departing from the spirit and scope of the present disclosure as defined in the claims.

REFERENCE SIGNS LIST 7 control unit
10 refrigerant circuit
21 compressor
22 four-way switching valve
23 outdoor heat exchanger (heat exchanger)
25 expansion valve
31 indoor heat exchanger (heat exchanger)
50 refrigerant pipe
50a bent portion
51 pipe body
52 anticorrosive film
60 heat transfer fin
61 fin body
62 hole
70 U-shaped pipe
100 air conditioner

CITATION LIST

Patent Literature

PTL 1: Japanese Patent No. 6041014

The invention claimed is:

1. An intermediate product of a refrigerant pipe comprising:
a pipe body including copper or a copper alloy; and
an anticorrosive film formed on an outer surface of the pipe body,
wherein the anticorrosive film includes
a volatile metalworking fluid that is capable of being volatilized at 180° C. or higher, and
one or more anticorrosive agents selected from the group consisting of
calcium dinonylnaphthalene sulfonate or an organic sulfonate compound represented by formula (III) below and/or an organic sulfonate compound represented by formula (IV) below, in an amount of 0.1 µg or more and 200.0 µg or less per square centimeter:

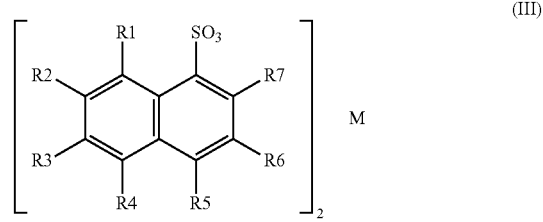

wherein R1 to R7 each independently represent hydrogen or an aliphatic hydrocarbon group having 4 to 12 carbon atoms except that R1 to R7 cannot all be hydrogen, and M represents Ca or Zn,

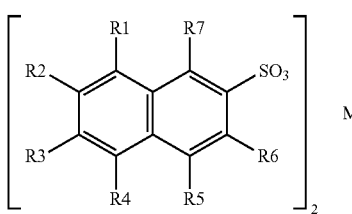

wherein R1 to R7 each independently represent hydrogen or an aliphatic hydrocarbon group having 4 to 12 carbon atoms except that R1 to R7 cannot all be hydrogen, and M represents Ca or Zn.

2. An intermediate product of a refrigerant pipe comprising:
a pipe body including copper or a copper alloy; and
an anticorrosive film formed on an outer surface of the pipe body,
wherein the anticorrosive film is obtained by applying a coating agent to the outer surface of the pipe body, the coating agent containing;
a volatile metalworking fluid that is capable of being volatilized at 180° C. or higher, and
calcium dinonylnaphthalene sulfonate in an amount of 0.1 wt % or more and 8.0 wt % or less.

3. The intermediate product of a refrigerant pipe according to claim 2, wherein the anticorrosive film is obtained by drying the applied coating agent under conditions where the coating agent has a surface temperature of 60° C. or higher and 200° C. or lower.

4. A heat exchanger comprising:
a heat transfer tube that is the refrigerant pipe according to claim 1; and
a heat transfer fin fixed to the heat transfer tube.

5. The heat exchanger according to claim 4,
wherein the heat transfer fin is formed of aluminum or an aluminum alloy, and
the anticorrosive agent is not present on an outer surface of the heat transfer fin.

* * * * *